US012498289B2

(12) United States Patent
Jobin et al.

(10) Patent No.: US 12,498,289 B2
(45) Date of Patent: Dec. 16, 2025

(54) SENSOR STRIP FOR LIQUID OR HUMIDITY DETECTION AND APPLICATIONS AND USES THEREOF

(71) Applicant: Intechfloor SA, Lausanne (CH)

(72) Inventors: Martin Jobin, Lausanne (CH); Jérome Meugnier, Lausanne (CH); Jean-Sébastien Moinier, Lausanne (CH)

(73) Assignee: Intechfloor SA, Lausanne (CH)

( * ) Notice: Subject to any disclaimer, the term of this patent is extended or adjusted under 35 U.S.C. 154(b) by 0 days.

(21) Appl. No.: 19/063,972

(22) Filed: Feb. 26, 2025

(65) Prior Publication Data

US 2025/0198874 A1    Jun. 19, 2025

Related U.S. Application Data

(63) Continuation of application No. PCT/IB2023/062888, filed on Dec. 18, 2023.

(30) Foreign Application Priority Data

Dec. 23, 2022    (WO) .................. PCT/IB2022/062730

(51) Int. Cl.
*G01M 3/16*        (2006.01)
*G08C 17/02*       (2006.01)
(52) U.S. Cl.
CPC ............. *G01M 3/16* (2013.01); *G08C 17/02* (2013.01)
(58) Field of Classification Search
CPC ...................................................... G01M 3/165
See application file for complete search history.

(56) References Cited

U.S. PATENT DOCUMENTS 6,144,209 A    11/2000   Raymond et al.
8,966,973 B1    3/2015   Milone
(Continued)

FOREIGN PATENT DOCUMENTS

CN       100395543 C    6/2008
DE       3713032 A1    11/1988
(Continued)

OTHER PUBLICATIONS

English Translation of WO-0016058-A1 (Year: 2000).*
(Continued)

*Primary Examiner* — Alexander A Mercado
(74) *Attorney, Agent, or Firm* — Taft Stettinius & Hollister LLP

(57) ABSTRACT

A sensor strip for detecting a presence of liquid, especially water, flowing over a selected region of a floor surface, or a level of humidity in the selected region of the floor surface. The sensor strip includes a substantially flat and elongated insulating substrate made of flexible material and designed to be laid on the floor surface. The sensor strip exhibits a width (measured in a transverse direction), a length (measured in a longitudinal direction), and a thickness (measured perpendicularly to the longitudinal and transverse directions). The sensor strip includes a plurality of conductive tracks which are provided on the insulating substrate and extend substantially in the longitudinal direction, and at least one insulating layer covering the conductive tracks with the exception of one or more selected detection areas where parts of the conductive tracks are exposed for detection of the presence of liquid or of the level of humidity.

27 Claims, 11 Drawing Sheets

(56) References Cited

U.S. PATENT DOCUMENTS

| | | |
|---|---|---|
| 10,876,918 B2 | 12/2020 | Murakami |
| 10,935,508 B2 | 3/2021 | Zhang et al. |
| 2005/0225335 A1 | 10/2005 | Filipkowski |
| 2015/0116118 A1* | 4/2015 | Yu .......................... G08B 21/18 |
| | | 340/605 |
| 2018/0094999 A1* | 4/2018 | Aliyu ...................... G01M 3/04 |
| 2019/0094097 A1* | 3/2019 | Cavalheiro ............ G08B 21/20 |

FOREIGN PATENT DOCUMENTS

| | | | |
|---|---|---|---|
| DE | 102020003703 A1 | 12/2021 | |
| EP | 3002884 B1 | 4/2018 | |
| KR | 102217018 B1 | 2/2021 | |
| WO | WO-0016058 A1 * | 3/2000 | ............ G01M 3/165 |
| WO | WO-2010064753 A1 * | 6/2010 | ............ G01M 3/165 |
| WO | 2021018476 A1 | 2/2021 | |
| WO | 2021018477 A1 | 2/2021 | |
| WO | WO-2021116233 A1 * | 6/2021 | ............ E04D 13/006 |

OTHER PUBLICATIONS

English Translation of WO-2021116233-A1 (Year: 2021).*
International Search Report; European Patent Office; International Application No. PCT/IB2023/062888; Apr. 11, 2024; 6 pages.
Written Opinion of the International Searching Authority; European Patent Office; International Application No. PCT/IB2023/062888; Apr. 11, 2024; 8 pages.

* cited by examiner

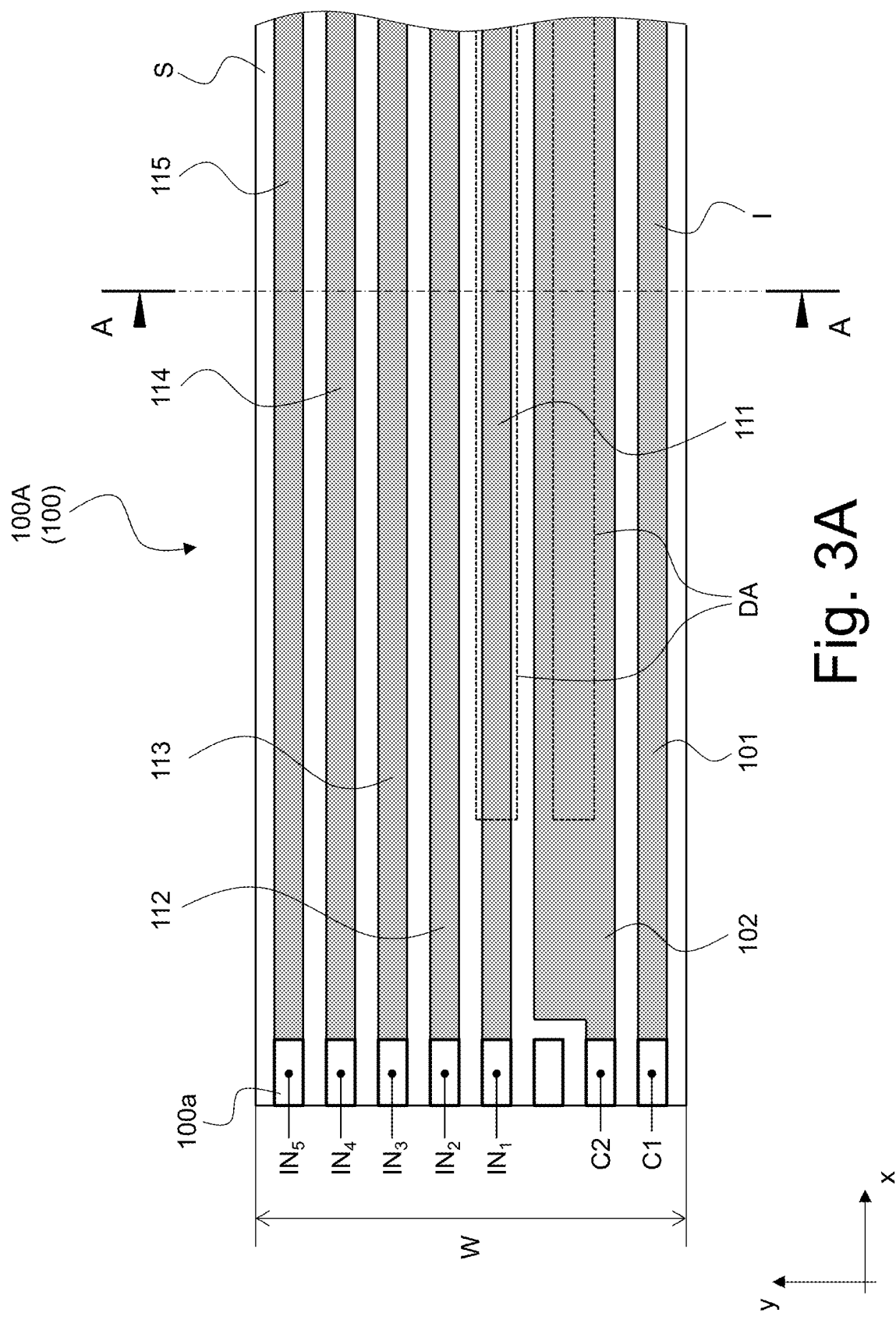

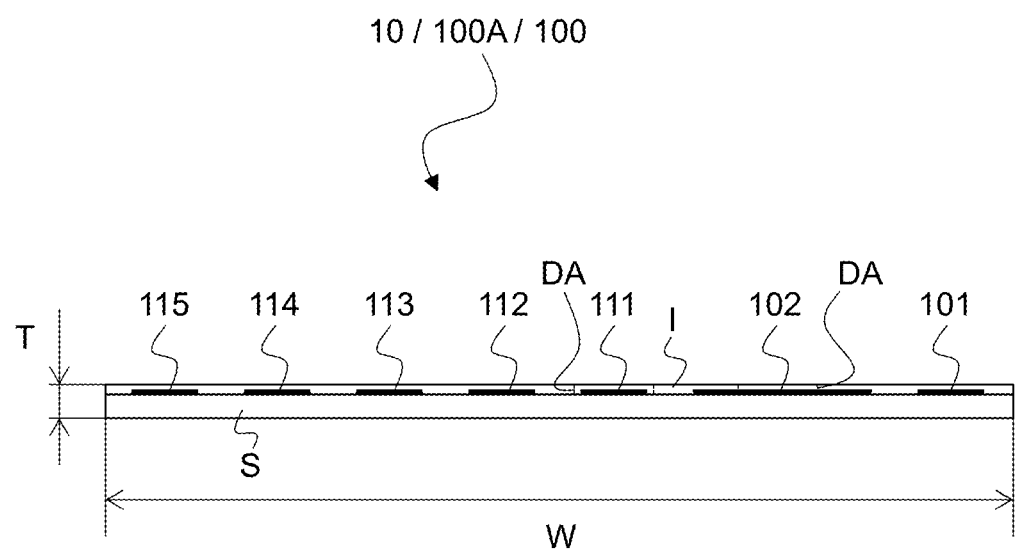
Fig. 3C
(A-A)
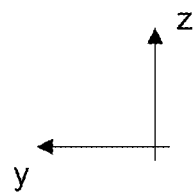

SENSOR STRIP FOR LIQUID OR HUMIDITY DETECTION AND APPLICATIONS AND USES THEREOF

CROSS REFERENCE TO RELATED APPLICATIONS

This application is a continuation of International Patent Application No. PCT/IB2023/062888 filed Dec. 18, 2023, which claims priority to International Patent Application No. PCT/IB2022/062730 filed Dec. 23, 2022, the contents of each application are hereby incorporated by reference in their entirety.

TECHNICAL FIELD

The present invention generally relates to a sensor strip for detecting a presence of liquid, especially water, flowing over a selected region of a floor surface or a level of humidity in the selected region of the floor surface, as well as a related sensor device including such a sensor strip and sensor unit electrically connected to the sensor strip to gather data measured using the sensor strip. The invention also relates to uses of the aforementioned sensor strip and sensor device, as well as to a sensor system comprising at least one remote unit and one or multiple sensor devices in accordance with the invention in operative communication with the at least one remote unit to share data therewith or therethrough. The invention further relates to a flooring system for covering a floor surface, for use in an industrial or commercial environment comprising one or multiple refrigerating apparatuses positioned on the floor surface, the flooring system including a floor covering that is laid over the floor surface and being provided with sensor strip (especially a sensor strip according to the invention) that is positioned on the floor surface under the floor covering to detect a flow of liquid, such as water, spreading between the floor covering and the floor surface. The invention also relates to a corresponding method of detecting a presence of liquid spreading between a floor surface and a floor covering that is laid over the floor surface.

BACKGROUND OF THE INVENTION

Solutions to detect the presence of liquid are known as such in the art.

U.S. Pat. No. 6,144,209 A discloses an elongated fluid detection cable for use in detecting the presence of fluid (e.g. water) in areas where fluid is not desired. The cable includes a non-conductive base and at least two conductive members, such as wires. The base is twisted about its longitudinal axis, and the two conductive members are protected from touching conductive surfaces. The cable is connected to a control system which will activate an alarm when fluid contacts the conductive members of the cable. In one embodiment, the cable includes four conductive members. The main disadvantage of this solution resides in the fact that it is not readily applicable for use to detect the presence of liquid flowing over a selected region of a floor surface due to the relatively thick cross-section of the cable. This solution cannot, in particular, be readily used to detect the possible spreading of fluid between the floor surface and a floor covering that is laid over the floor surface.

Solutions have also been proposed wherein the sensing device is packaged entirely into a housing as disclosed for instance in International (PCT) Publications Nos. WO 2021/018476 A1, WO 2021/018477 A1 as well as U.S. Pat. Nos. 10,876,918 B2 and 10,935,508 B2. While such solutions could be used to detect fluid flowing over a floor surface, they cannot be readily used to detect the possible spreading of fluid between the floor surface and a floor covering that is laid over the floor surface due to the relatively bulky configuration of the sensing device.

U.S. Pat. No. 8,966,973 B1 discloses a capacitive liquid level sensor material, which includes a first thin, flexible elongated insulating substrate of indeterminate length having a continuous sensing capacitor printed thereon. The sensing capacitor has a repeating interdigitated capacitive pattern formed by two separate electrodes printed on the substrate. There is a second thin, flexible, elongated insulating substrate of indeterminate length joined to the first substrate to electrically isolate the sensing capacitor, and the electrodes coplanar. The second substrate has an ink pattern printed thereon. The joined first and second substrates are arranged to be wound up into a roll of at least several turns. The sensor material is then cut to length and terminated with a crimp type connector to produce a sensor of desired length. This solution is particularly used by the automobile industry for measuring the level of fluids (such as fuel, antifreeze fluid, windshield washer fluid, etc.) inside fluid tanks and vessels. This solution is not readily transposable for use to detect the presence of liquid flowing over a floor surface.

German Patent Publication No. DE 37 13 032 A1 discloses a water monitor that is equipped with at least one water sensor, which consists of two sensor electrodes placed at a distance from each other on a horizontal floor to be monitored, which electrodes are equipped with a termination resistance. The sensor electrodes consist of conductive wires and are connected to a monitoring circuit, which monitors the water sensor for water flooding as well as possible wire breakage. While this solution can be used to detect the presence of liquid flowing over a floor surface, the use of simple conductive wires as electrodes renders this solution somewhat complex and difficult to deploy in practice as a suitable solution needs to be contemplated to ensure that the conductive wires are correctly positioned on the floor surface and spaced apart one from the other. According to German Patent Publication No. DE 37 13 032 A1, multiple holding brackets are in particular provided to appropriately secure and hold each relevant conductive wire in place, individually, on the floor surface. In accordance with another embodiment, the conductive wires are flat and secured to the floor surface by means of screws. This solution becomes even more complex to deploy in practice if multiple distinct portions of the floor surface are to be monitored separately.

German Patent Publication No. DE 10 2020 003 703 A1 discloses a multilayer building film ("Baufolie") that can potentially be used as part of e.g. a flooring system including a floor covering for the purpose of detecting leakage of liquid spreading between a floor surface and the floor covering. An application of this multilayer building film for use in an industrial or commercial environment comprising one or multiple refrigerating apparatuses positioned on the floor surface is not explicitly contemplated.

U.S. Patent Publication No. US 2005/0225335 A1 discloses a moisture detector for detecting moisture in a closed environment. An application of the moisture detector as part of a flooring system including a floor covering for the purpose of detecting a presence of liquid, such as water, spreading between a floor surface and the floor covering that is laid over the floor surface is not explicitly contemplated.

There therefore remains a need for an improved solution.

SUMMARY OF THE INVENTION

A general aim of the invention is to provide a suitable sensor solution for detecting a presence of liquid, especially water, flowing over a selected region of a floor surface or a level of humidity in the selected region of the floor surface.

More specifically, an aim of the present invention is to provide such a solution that is simple, robust and cost-efficient to implement.

A further aim of the invention is to provide such a solution that is especially suited for use in connection with a flooring system as applied for covering a floor surface in, particularly, an industrial or commercial environment. More specifically, an aim of the invention is to provide such a solution that can be used in an environment comprising one or multiple fridges, freezers, refrigerated cabinets or like refrigerating apparatuses that are positioned on the floor surface, next to the floor covering.

Another aim of the invention is to provide such a solution that is easily adaptable and scalable to adapt to the particular environment in which it is to be deployed.

These aims, and others, are achieved thanks to the solutions defined in the claims.

There is accordingly provided, in accordance with a first aspect of the invention, a sensor strip for detecting a presence of liquid, especially water, flowing over a selected region of a floor surface or a level of humidity in the selected region of the floor surface, the features of which include a sensor strip comprising a substantially flat and elongated insulating substrate made of flexible material and designed to be laid on the floor surface, wherein the sensor strip exhibits a width as measured in a transverse direction, a length as measured in a longitudinal direction, and a thickness as measured perpendicularly to the longitudinal and transverse directions. According to this first aspect of the invention, the sensor strip includes a plurality of conductive tracks, which are provided on the insulating substrate and extend substantially in the longitudinal direction, and at least one insulating layer covering the conductive tracks with the exception of one or more selected detection areas where parts of the conductive tracks are exposed for detection of the presence of liquid or of the level of humidity.

Various preferred and/or advantageous embodiments of this sensor strip are disclosed below.

Also disclosed is a sensor device for detecting a presence of liquid, especially water, flowing over a selected region of a floor surface or a level of humidity in the selected region of the floor surface, wherein the sensor device includes a sensor strip in accordance with the invention and a sensor unit electrically connected to the sensor strip to gather data measured using the sensor strip.

Various preferred and/or advantageous embodiments of this sensor device are disclosed below.

Preferred uses of the sensor strip and sensor device of the invention are also disclosed below.

Further disclosed is a sensor system comprising at least one remote unit and one or multiple sensor devices according to the invention in operative communication with the at least one remote unit to share data therewith or therethrough.

Various preferred and/or advantageous embodiments of this sensor system are disclosed below.

In accordance with a further aspect of the invention, a flooring system for covering a floor surface, for use in an industrial or commercial environment comprising one or multiple refrigerating apparatuses positioned on the floor surface, is moreover provided, the features of which include a flooring system including a floor covering (such as but not limited to a floor covering made of individual flooring tiles or of a continuous or semicontinuous sheet of cover material) that is laid over the floor surface, the floor covering being positioned next to an area covered by the one or multiple refrigerating apparatuses, the flooring system being provided with a substantially flat and elongated sensor strip that is positioned on the floor surface under the floor covering, which sensor strip is adapted to detect a flow of liquid, such as water, spreading between the floor covering and the floor surface, and the sensor strip being positioned under the floor covering to detect flow of liquid caused by leaks or condensation of liquid from the one or multiple refrigerating apparatuses and spreading between the floor covering and the floor surface.

Various preferred and/or advantageous embodiments of this flooring system are disclosed below.

Also disclosed is a method of detecting a presence of liquid, such as water, spreading between a floor surface and a floor covering that is laid over the floor surface, the method being applied in an industrial or commercial environment comprising one or multiple refrigerating apparatuses positioned on the floor surface, wherein the floor covering is positioned next to an area covered by the one or multiple refrigerating apparatuses. The method comprises the following steps, namely, (i) positioning a substantially flat and elongated sensor strip on the floor surface under the floor covering, which sensor strip is adapted to detect a flow of liquid spreading between the floor covering and the floor surface, the sensor strip being positioned under the floor covering to detect flow of liquid caused by leaks or condensation of liquid from the one or multiple refrigerating apparatuses and spreading between the floor covering and the floor surface, and (ii) gathering data measured using the sensor strip and processing such data to check for the presence of liquid.

Various preferred and/or advantageous embodiments of this method are disclosed below.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIG. 3A is a schematic top view of an upstream end of a foremost one of the sensor strip sections of FIG. 2;

FIG. 3C is a schematic cross-sectional view of the sensor strip section of FIGS. 3A-B as taken along cross-sectional plane A-A indicated in FIG. 3A;

in FIG. 3A, of the foremost sensor strip section of the sensor strip;

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein as defined by the appended claims.

As described herein, when two or more parts or components are described as being connected, attached, secured or coupled to one another, they can be so connected, attached, secured or coupled directly to each other or through one or more intermediary parts.

Embodiments of the invention will especially be described with reference to FIGS. 1A-B to 8.

Figure 1A:
FIG. 1A is a photographic illustration of part of a sensor strip in accordance with an embodiment of the invention, which sensor strip is laid over a floor surface next to refrigerated cabinets that are positioned on the floor surface.
Figure 1B:
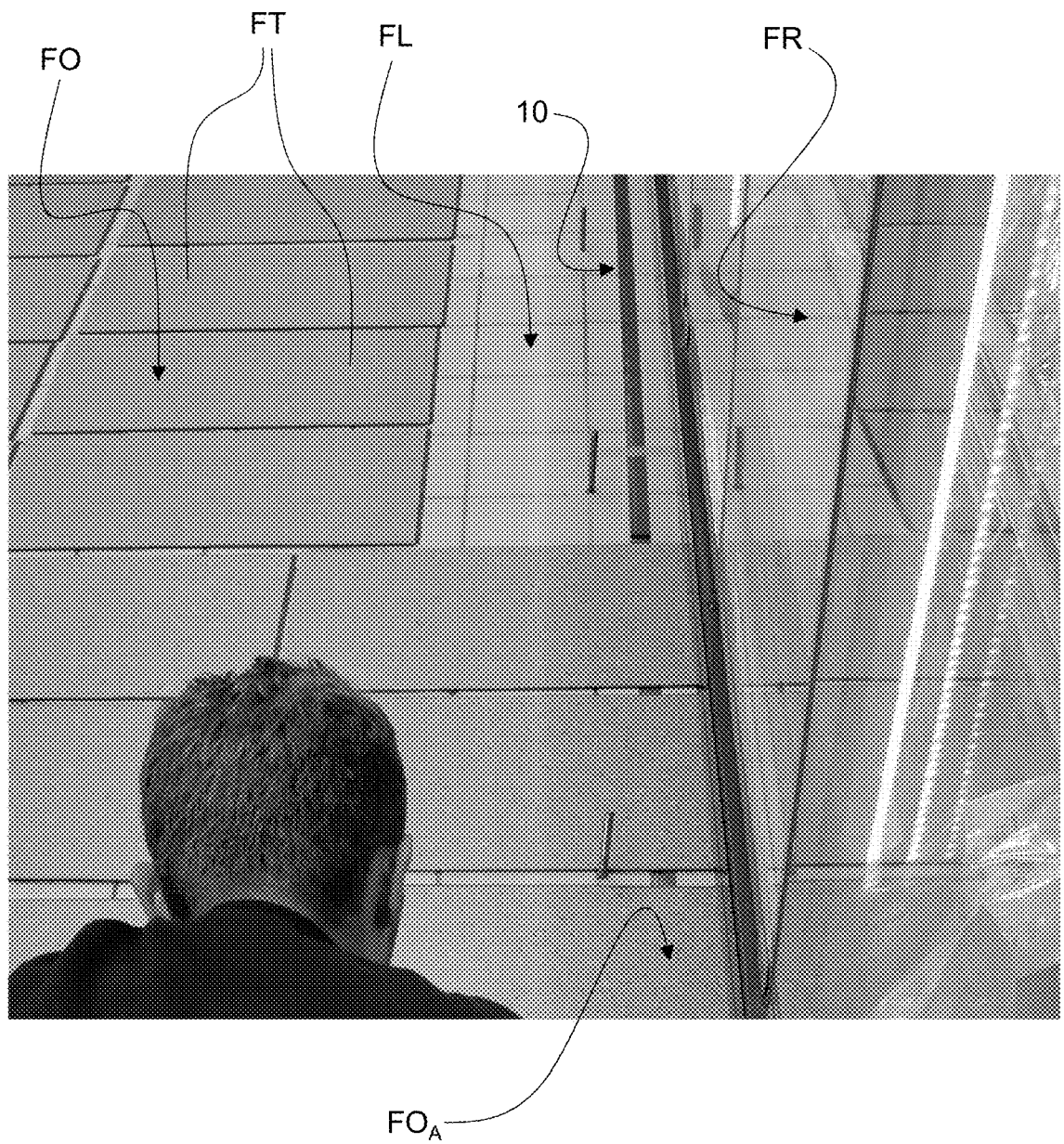
FIG. 1B is a photographic illustration of part of the sensor strip shown in FIG. 1A being covered by flooring tiles forming a floor covering that is laid over the floor surface and the sensor strip.

FIGS. 1A and 1B are photographic illustrations of part of a substantially flat and elongated sensor strip, designated by reference numeral 10, in accordance with an embodiment of the invention, which sensor strip 10 is laid over a floor surface FL, next to a series of refrigerated cabinets FR (or like refrigerating apparatuses) as found for instance in a hypermarket or supermarket environment. FIG. 1B more specifically shows the sensor strip 10 being partly overlaid by flooring tiles FT that are assembled to form a floor covering FO that is laid over the floor surface FL to cover the sensor strip 10. In the illustrated example, the sensor strip 10 is ultimately positioned along and under a border section $FO_A$ of the floor covering FO with a view to detect flow of liquid originating from the refrigerating apparatuses FR and spreading between the border section $FO_A$ of the floor covering FO and the floor surface FL. The liquid may especially be water that is caused by leaks originating from the refrigerating apparatuses FR and/or condensation of liquid induced by the refrigerating apparatuses FR.

The sensor strip 10 of the invention comprises a substantially flat and elongated insulating substrate (designated hereinafter by reference sign S) that is made of flexible material and exhibits a certain width (designated by reference sign W in FIGS. 2, 3A and 3C) as measured in a transverse direction, a certain length (designated by reference sign L in FIG. 2) as measured in a longitudinal direction, and a thickness (designated by reference sign T in FIG. 3C) as measured perpendicularly to the longitudinal and transverse directions.

In other embodiments, the sensor strip 10 could be positioned directly under the refrigerating apparatuses and does not necessarily need to be covered by the floor covering FO. The sensor strip 10 may in effect be positioned immediately next to the border section $FO_A$ of the floor covering.

Positioning of the sensor strip 10 along and under the border section $FO_A$ of the floor covering FO (or immediately next to it) is particularly advantageous in that this allows detection of liquid spreading (or bound to spread) from the sides between the floor covering FO and the floor surface FL, which may not be readily identifiable by a mere visual inspection as the floor covering FO obstructs the view. Without the provision of a sensor strip according to the invention, liquid originating from under the refrigerating apparatuses FR may spread over a large area under the floor covering FO and cause extensive damage before being even noticed, which may necessitate replacement of substantial portions of the floor covering FO or potentially costly repairs of the floor surface FL, which is not desirable. The provision of the sensor strip 10 according to the invention therefore helps mitigating such problems and provides further benefits, including e.g. detection of potentially slippery surfaces that could become a safety hazard for customers, as well as prevention of mildew growth or bacterial formations that could cause issues from a hygiene standpoint.

Figure 2:
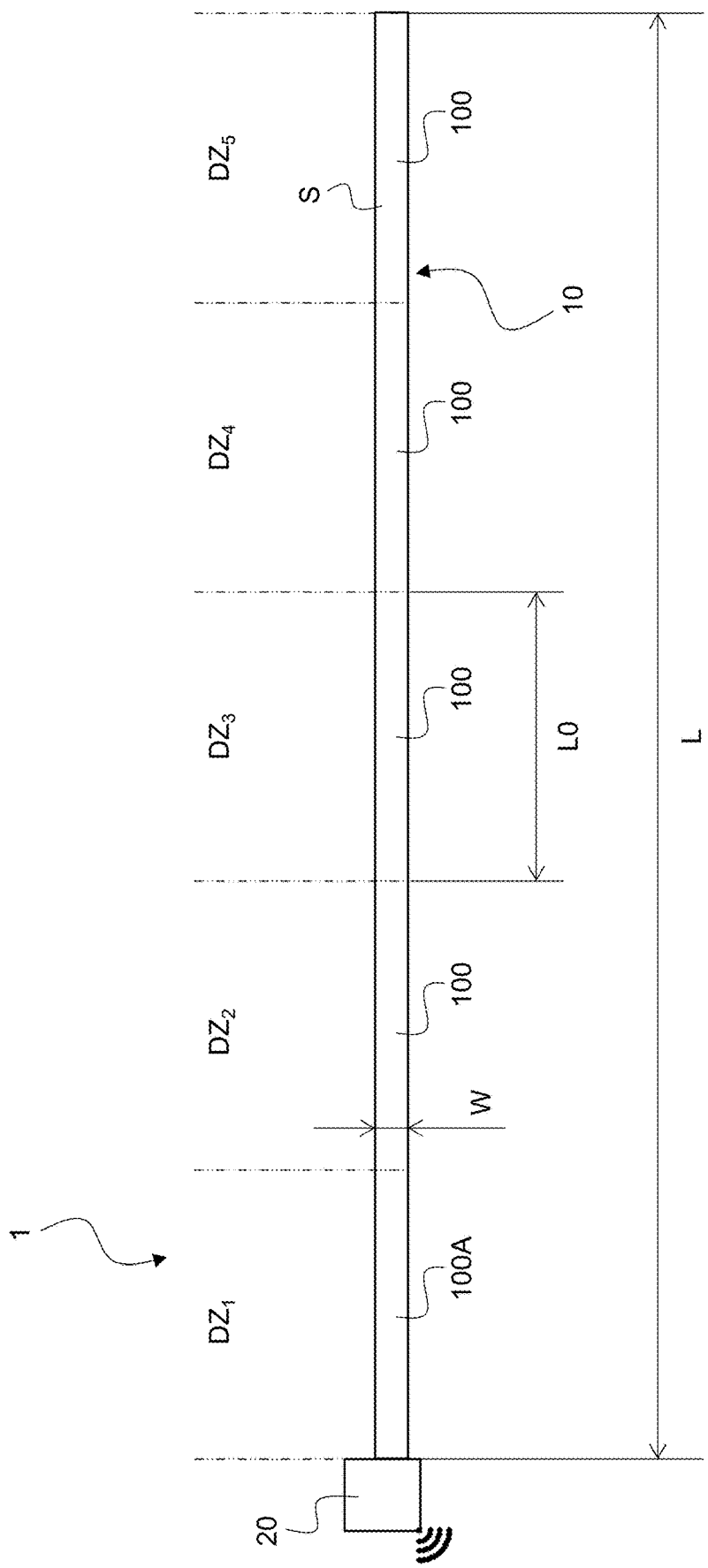
FIG. 2 is a schematic top view of a sensor device according to a preferred embodiment of the invention which comprises a sensor strip that is coupled to a dedicated sensor unit, the sensor strip including multiple sensor strip sections that each are assigned to a corresponding one of multiple detection zones.

FIG. 2 is a schematic top view of a sensor device, designated globally by reference numeral 1, according to a preferred embodiment of the invention, which sensor device 1 comprises a sensor strip 10 (as shown e.g. in FIGS. 1A-B) that is coupled to a dedicated sensor unit 20. As previously mentioned, the sensor strip 10 comprises a substantially flat and elongated insulating substrate S made of flexible material and designed to be laid on the floor surface FL. The sensor strip 10 exhibits a width W as measured in a transverse direction y, a length L as measured in a longitudinal direction x, and a thickness T as measured perpendicularly to the longitudinal and transverse directions x, y, namely, in a vertical direction z (see FIG. 3C).

According to the invention, the sensor strip 10 includes a plurality of conductive tracks (not shown in FIG. 2) that are provided on the insulating substrate S and extend substantially in the longitudinal direction x. These conductive tracks are covered with at least one insulating layer, with the exception of one or more selected detection areas where parts of the conductive tracks are exposed for detection of the presence of liquid (or of a level of humidity as the case may be).

The insulating substrate S may be made of any suitable flexible insulating material, such as a polyimide or polyethylene terephthalate (PET) material. In that regard, one particular advantage resulting from the use of a flexible substrate resides in that the sensor strip 10 may be folded and/or wound into a roll as desired, in particular for storage and/or shipment purposes. In one embodiment, the sensor strip 10 may especially be wound around the sensor unit 20.

In the example of FIG. 2, the sensor strip 10 includes multiple (here five) sensor strip sections 100A, 100 that are each assigned to a corresponding one of multiple detection zones $DZ_1$-$DZ_5$ that are distributed one after the other along the length L of the sensor strip 10. In the illustrated example, five such detection zones $DZ_1$-$DZ_5$ (and sensor strip sections 100A, 100) are provided, but it will be appreciated that any number of detection zones could be contemplated. Up to twenty detection zones (or even more) could for instance be envisaged.

Each detection zone $DZ_1$-$DZ_5$ preferably exhibits a predefined length L0. Such predefined length L0 may advantageously be of the order of 0.5 m to 5 m. By way of illustration, the predefined length L0 may be of approximately 1.2 m, meaning that the overall length L of the sensor strip 10 is of approximately 6 m in the illustrated example. In practice, the overall length L of the sensor strip may typically exceed 0.5 m and extend e.g. up to 25 m, or possibly more.

The width W of the sensor strip 10 is preferably of less than 10 cm, even more preferably of 5 cm or less. The thickness T of the sensor strip 10 is preferably of less than 1 mm, even more preferably of 0.5 mm or less.

By way of preference, the multiple sensor strip sections 100A, 100 are individual sensor strip sections that are connected in series one after the other to form the sensor strip 10 and that share a same arrangement of a plurality of conductive tracks, as described with reference to FIGS. 3A-D which are illustrative of a particularly preferred embodiment of the invention.

Figure 3B:
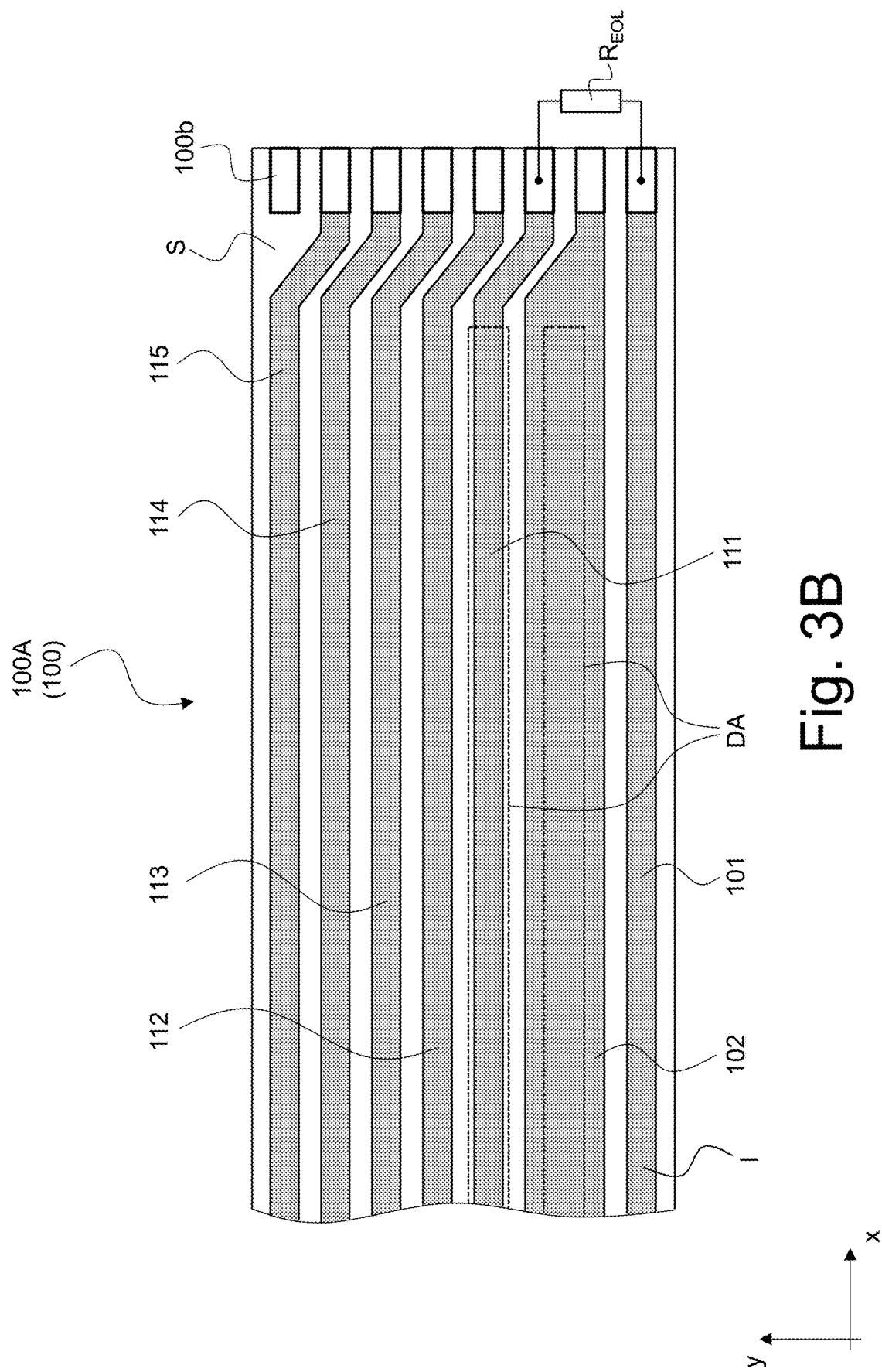
FIG. 3B is a schematic top view of a downstream end of the sensor strip section of FIG. 2.

FIGS. 3A-B are especially illustrative of upstream and downstream ends of a foremost one of the sensor strip sections, designated by reference sign 100A, which foremost sensor strip section 100A is the first sensor strip section that is coupled to the sensor unit 20. In the illustrated example, all remaining sensor strip sections 100 preferably share the same configuration as the foremost sensor strip section 100A as described hereafter.

Visible in FIGS. 3A-D is the insulating substrate S which is provided on its upper side with a plurality of distinct conductive tracks 101, 102 and 111-115 that extend substantially in the longitudinal direction x and the at least one insulating layer, designated by reference sign I, that covers the conductive tracks 101, 102, 111-115 with the exception of one or more selected detection areas DA.

More specifically, in the illustrated example, the plurality of conductive tracks comprises a pair of reference tracks, designated by reference numerals 101 and 102, and a plurality of (here five) detection tracks, designated by reference numerals 111 to 115, for detection of the presence of liquid. In the illustrated example, one of the reference tracks 101, 102, namely, reference track 102, and a first one of the detection tracks 111-115, specifically, detection track 111, are at least partly exposed in the selected detection areas DA to act as sensor electrodes. The relevant portions of the reference track 102 and of the first detection track 111 are exposed by selectively omitting or removing the insulating layer I in the selected detection areas DA. According to this preferred embodiment, all other portions of the relevant sensor strip sections 100A, 100 are in essence insulated between the insulating substrate S and the insulating layer I, with the further exception of the upstream and downstream ends of each conductive track 101, 102, 111-115 that are provided with corresponding contact pads 100$a$, 100$b$ (see FIGS. 3A, 3B and 3D).

Figure 6:
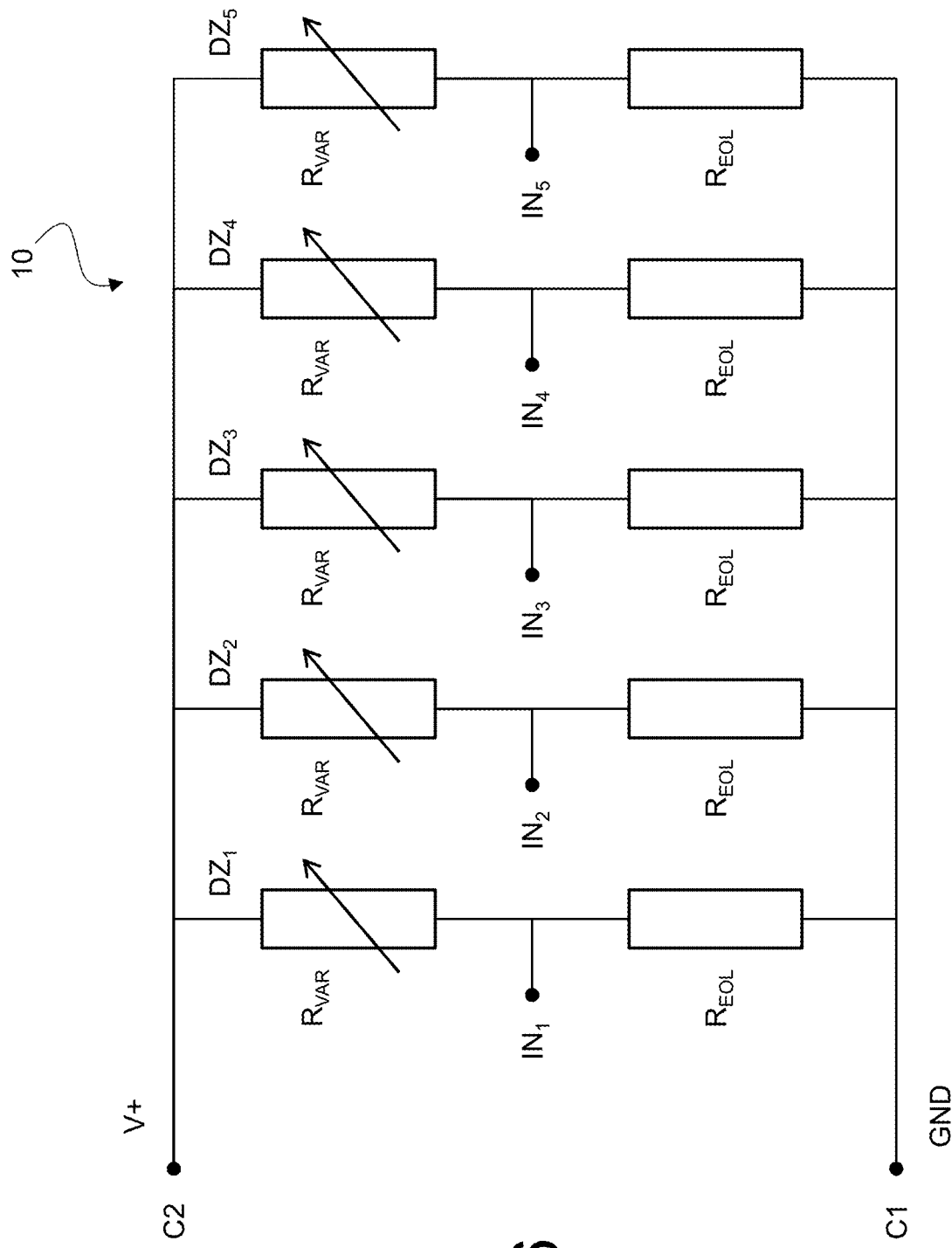
FIG. 6 is a schematic illustration of the equivalent electrical circuit diagram of the sensor strip depicted in FIGS. 2 to 3A-D.

In the illustrated example, the multiple detection tracks 111-115 are configured such that each detection track 111-115 of the foremost sensor strip section 100A is assigned to a corresponding one of the distinct detection zones $DZ_1$-$DZ_5$ and forms a corresponding one of multiple liquid detection inputs $IN_1$-$IN_5$ as depicted in FIG. 3A, which inputs $IN_1$-$IN_5$ are connected to the sensor unit 20. More precisely, the first to fifth conductive tracks 111-115 are respectively assigned to the first to fifth detection zones $DZ_1$-$DZ_5$, resulting in first to fifth corresponding liquid detection inputs $IN_1$-$IN_5$. The first and second reference tracks 101, 102 form corresponding reference inputs $C_1$, $C_2$, which are likewise connected to the sensor unit 20 and brought to defined electrical potentials. The first reference tracks 101 of all sensor strip sections 100A, 100 are connected together to form a common first reference line extending all the way from one end to the other of the sensor strip 10, which is brought to e.g. a ground potential GND (as schematically shown in the equivalent electrical circuit diagram depicted in FIG. 6). Similarly, the second reference tracks 102 of all sensor strip sections 100A, 100 are connected together to form a common second reference line extending all the way from one end to the other of the sensor strip 10, which is brought to e.g. a positive electrical potential V+ (as schematically shown in FIG. 6). This second reference line here acts as one of the sensor electrodes for each detection zone $DZ_1$-$DZ_5$.

Figure 3D:
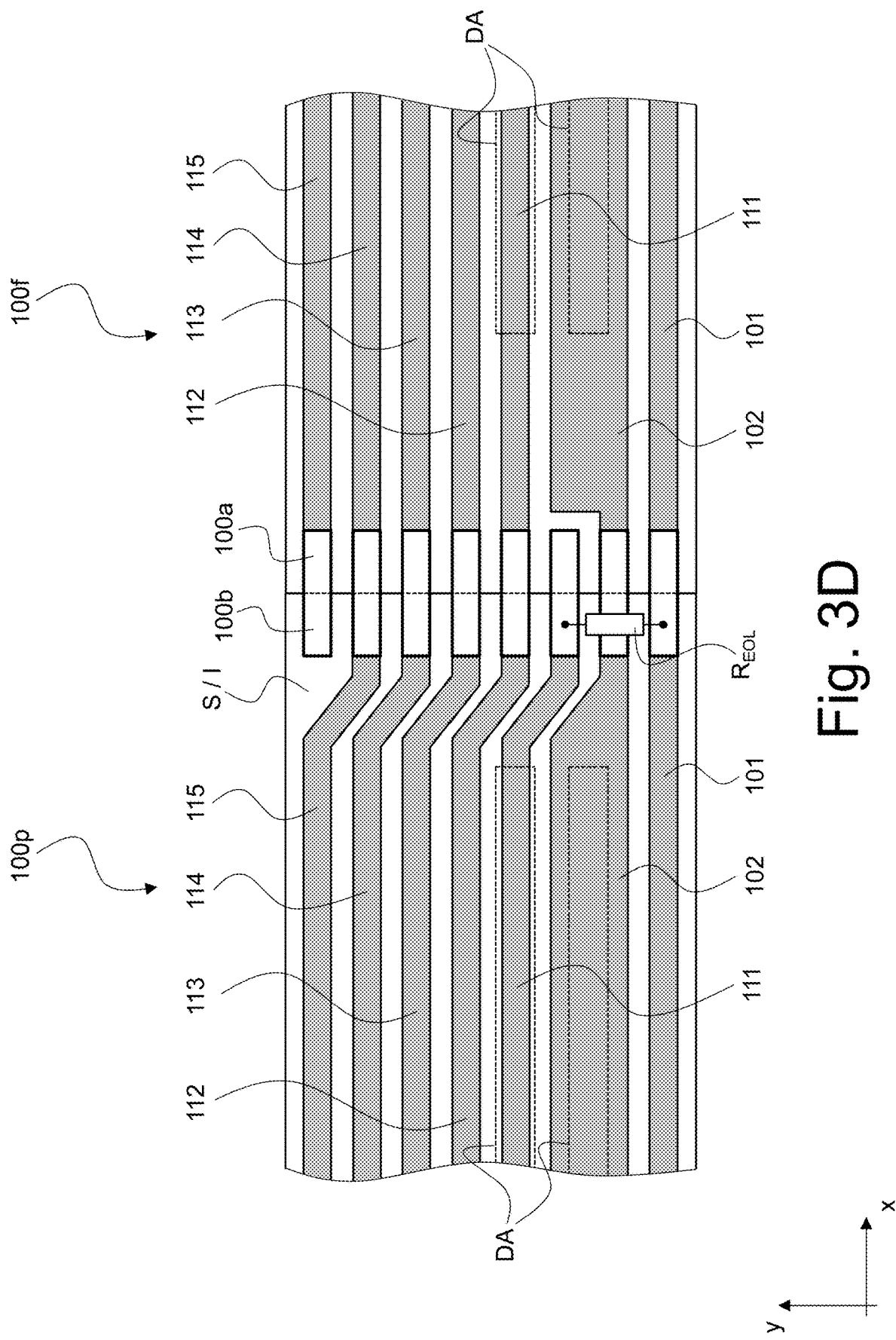
FIG. 3D is a schematic top view of a connection between preceding and following sensor strip sections.

In each detection zone $DZ_1$-$DZ_5$, the first detection track 111 is the only detection track being at least partly exposed to act as the second sensor electrode, along with the first sensor electrode formed by the second reference track 102 which is likewise at least party exposed. In addition, at a downstream end of each sensor strip section 100A, 100, as depicted in FIG. 3B (see also FIG. 3D which shows the interconnection between preceding and following sensor strip sections 100$p$, 100$f$) the first detection track 111 comes to an end, at its contact pad 100$b$, and is terminated by an end of line resistor $R_{EOL}$. In the particular example, each end of line resistor $R_{EOL}$ is connected between the first detection track 111 and the first reference track 101. Furthermore, at a transition between preceding and following sensor strip sections 100$p$, 100$f$, as depicted in FIG. 3D, the second to last detection tracks 112-115 of the preceding sensor strip section 100$p$ are respectively connected to the first to penultimate detection tracks 111-114 of the following sensor strip section 100$f$ via a suitable connection of the relevant contact pads 100$a$, 100$b$. Lastly, the last detection track 115 of each following sensor strip section 100$f$ is not connected to any detection track of the preceding sensor strip section 100$p$ and is not accordingly exploited for detection purposes.

One will therefore appreciate and understand that the first liquid detection input $IN_1$ connects to the first detecting track 111 of the foremost sensor strip section 100A which is assigned to the first detection zone $DZ_1$, while the second liquid detection input $IN_2$ connects to the first detection track 111 of the following (second) sensor strip section 100, via the second detection track 112 of the foremost sensor strip section 100A, which (second) sensor strip section 100 is assigned to the second detection zone $DZ_2$. By the same token, the third to fifth liquid detection inputs $IN_3$-$IN_5$ respectively connect to the first detection track 111 of the third, fourth and fifth sensor strip sections 100 that are assigned to the corresponding third, fourth and fifth detection zones $DZ_3$-$DZ_5$.

While some of the detection tracks 112-115 provided on the sensor strip sections 100, downstream of the foremost sensor strip section 100A, are not exploited for any detection purposes, this solution is more cost-efficient to implement considering that all sensor strip sections 100A, 100 may share the same configuration and can thus be produced as identical strip sections, of predefined length L0, that can simply be connected in series, one after the other, as depicted in FIGS. 3A-D, depending on the number of detection zones that one wishes to cover, here ranging from one to five zones.

Alternatively, the entire sensor strip 10 may be designed as a single, uninterrupted sensor strip segment that is provided with only those detection tracks as necessary to perform measurements in the relevant detection zones $DZ_1$-$DZ_5$.

The sensor strip of the invention may advantageously be produced in the form of a roll of continuous strip material that can be cut to desired repeated lengths. In particular, the continuous strip material could be produced in such a way as to be cut into individual sensor strip sections, as discussed above, that are then connected one after the other to form the desired sensor strip, or to be cut into individual sensor strip segments covering the desired number of detection zones.

In order to facilitate identification of the relevant detection zones $DZ_1$-$DZ_5$, markings may be provided to identify a delimitation between adjacent detection zones $DZ_1/DZ_2$, $DZ_2/DZ_3$, $DZ_3/DZ_4$, $DZ_4/DZ_5$ and/or a start and/or end of each detection zone $DZ_1$-$DZ_5$.

Advantageously, the sensor strip 10 per se is designed as a totally passive element that is electrically connectable to the dedicated sensor unit 20, which sensor unit 20 is configured to power the sensor strip 10 and process signals as detected by the sensor strip 10, namely those coming from liquid detection inputs $IN_1$-$IN_5$.

Detection of liquid is carried out by using the conductive tracks 102, 111 as sensor electrodes to sense a change in resistivity caused by liquid spreading over and bridging the two sensor electrodes in the detection areas DA where conductive tracks 102, 111 are exposed, which detection technique is known per se in the art and is for instance embodied in the water sensor disclosed in German Patent Publication No. DE 37 13 032 A1.

FIG. 6 illustrates the equivalent electrical circuit diagram that results from the sensor strip configuration discussed above with reference to FIGS. 2 to 3A-D, it being understood that $R_{VAR}$ designates a variable resistance whose value changes depending on whether liquid flows, in any of the detection zones $DZ_1$-$DZ_5$, over the relevant sensor electrodes formed by conductive tracks 102, 111. One will appreciate and understand that, in the illustrated example, each relevant input $IN_1$-$IN_5$ in effect corresponds to the mid-point between the end of line resistor $R_{EOL}$ and the aforementioned variable resistance $R_{VAR}$, and that, depending on whether liquid flows over any of the relevant detection zones $DZ_1$-$DZ_5$, the variable resistance $R_{VAR}$ will change accordingly, resulting into a corresponding change of the analog measurement carried out at the relevant input $IN_1$-$IN_5$. This analog measurement can suitably be converted into a numerical value by means of an adequate analog-to-digital converter (ADC) embodied in the sensor unit 20 for further processing.

Figure 4A:
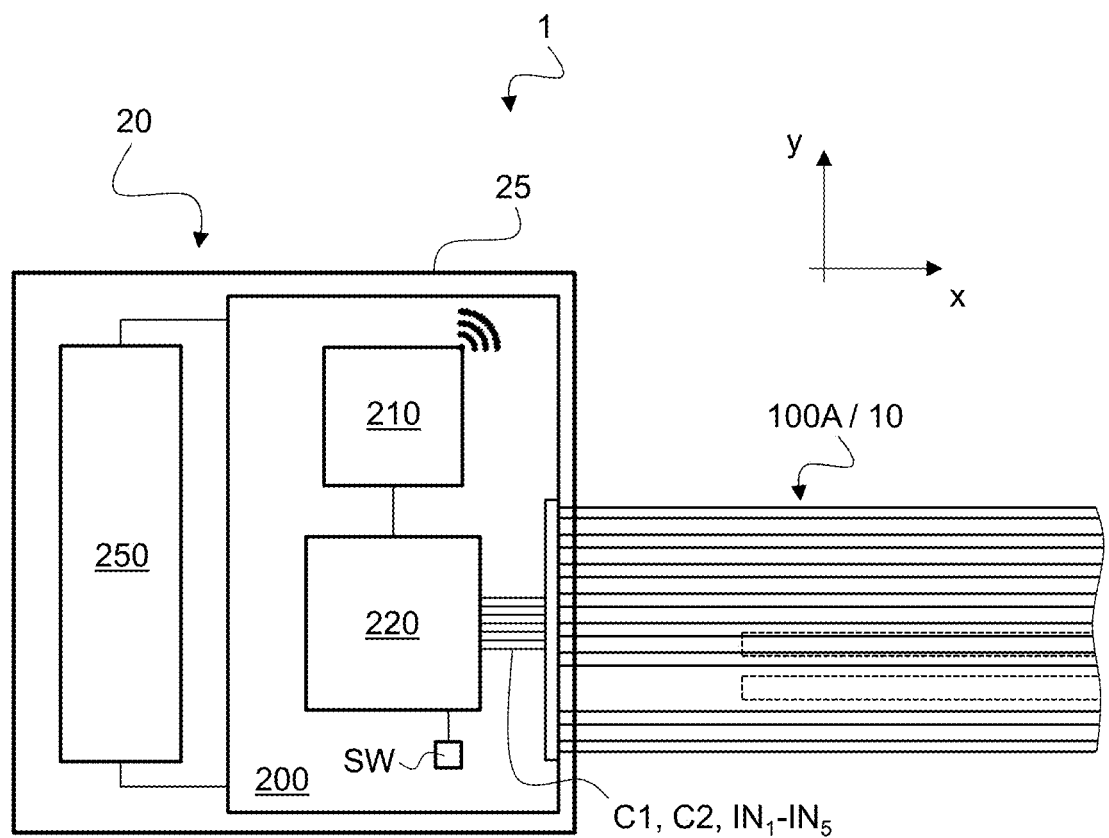
FIG. 4A is a schematic top view of the sensor unit of FIG. 2, from a functional perspective, coupled to the upstream end, as shown e.g.
Figure 4B:
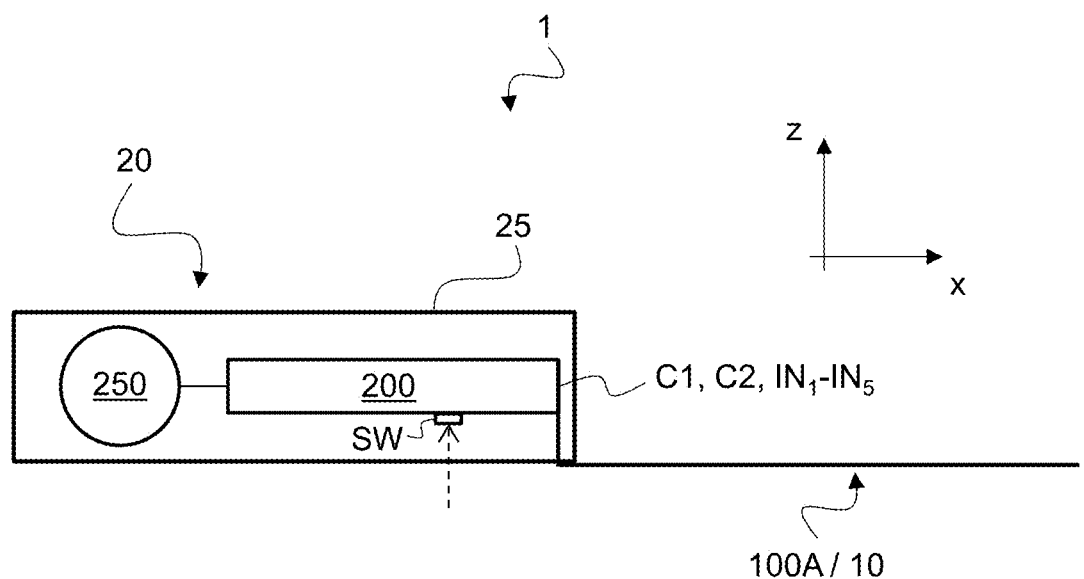
FIG. 4B is a schematic side view of the sensor unit of FIG. 4A.

FIGS. 4A-B schematically illustrate a preferred embodiment of the sensor unit 20 of FIG. 2 from a functional perspective. The sensor unit 20 constitutes the active component of the sensor device 1 that is electrically connected to the sensor strip 10 to gather data measured using the sensor strip 10. More specifically, the sensor unit 20 is connected to the upstream end of the foremost sensor strip section 100A (as depicted in FIG. 3A) to ensure that all conductive tracks 101, 102, 111-115, i.e. the corresponding inputs $C_1$, $C_2$, $IN_1$-$IN_5$ thereof, are connected to the electronics 200 of the sensor unit 20 whose purpose is to acquire and process data measured using the sensor strip 10. More specifically, suitable processing logic 220 is provided to carry out detection of any change of resistivity measured on any one of inputs $IN_1$-$IN_5$, which would be indicative of liquid spreading in the corresponding detection zone $DZ_1$, $DZ_2$, $DZ_3$, $DZ_4$ or $DZ_5$.

As shown in FIGS. 4A-B, the sensor strip 10 is here configured to be foldable for connection to the dedicated sensor unit 20, with the terminal end of the sensor strip 10 being folded upwards in the illustrated example, as shown in FIG. 4B.

As schematically depicted in the example of FIGS. 4A-B, the sensor unit 20 further comprises a power source 250 to power the electronics 200 and the sensor strip 10. This power source 250 is preferably a non-rechargeable, long-life battery, which is an adequate solution to achieve a low-cost implementation, but the use of rechargeable batteries could also come into consideration if desired. The use of a non-rechargeable battery as power source 250 does without the necessity to provide any recharging interface, which may unnecessarily increase production costs. In any event, the power source 250 is preferably configured to ensure a power autonomy of several years, especially of at least five years.

Ideally, the sensor unit 20 is configured to gather data packets for each detection zone $DZ_1$-$DZ_5$ on a periodic basis, for instance every hour, rather than continuously, which allows to reduce power requirements and thereby extend the life cycle of the sensor device 1. Advantageously, a timestamp is assigned to each data packet to allow determination of the evolution of measurements over time.

As the sensor strip 10 could consist of any desired number of sensor strip sections 100A, 100 depending on the effective number of detection zones $DZ_1$-$DZ_5$ being covered (ranging from one to five in the illustrated example), the sensor unit 20 is preferably further configured to automatically detect the effective number detection zones $DZ_1$-$DZ_5$. This may be determined depending on the presence or not of the relevant end of line resistor $R_{EOL}$ at the end of each relevant detection track 111-115. This also provides for the ability to detect any breakage or defect along the relevant detection tracks 111-115.

The sensor strip 10 is preferably calibrated to ensure that nominal measurements carried out in the detection zones $DZ_1$-$DZ_5$ (i.e. measurements carried out during a calibration phase in predefined, known conditions) do not deviate by more than 10% from one detection zone to the other, thereby ensuring homogeneity in the detection sensitivity amongst all relevant detection zones $DZ_1$-$DZ_5$. Such calibration can especially be done in software, for instance by defining relevant detection thresholds for each detection zone $DZ_1$-$DZ_5$.

The sensor unit 20 is preferably housed entirely within a sensor casing 25 that may especially be configured to be dustproof and waterproof, in particular with a view to comply e.g. with ingress protection code IP65 pursuant to International Standard IEC 60529. In the illustrated example, the sensor casing 25 exhibits a size of the order of 5 to 6 cm in width and length and a thickness of the order of 2 to 3 cm, which is sufficiently compact to be located on the underside of a refrigerating apparatus FR (as shown e.g. in FIGS. 1A-B). Attachment means, such as strong tape, may be provided on the sensor casing 25 for fixation to a nearby mounting surface, such as on the floor surface FL or under a refrigerating apparatus FR.

As previously mentioned, the sensor strip 10 (which typically measures several meters in length) may advantageously be wound around the sensor casing 25 for storage and/or shipment prior to installation on site.

As schematically illustrated in FIGS. 4A-B, the sensor unit 20 may be provided with a suitable user input SW (such as but not limited to an actuatable switch) accessible from outside the sensor casing 25 (for instance through a corresponding aperture made in the sensor casing 25 or using a contactless input such as a reed switch actuatable using a magnet) to initialize and/or reset the sensor unit 20.

Figure 5:
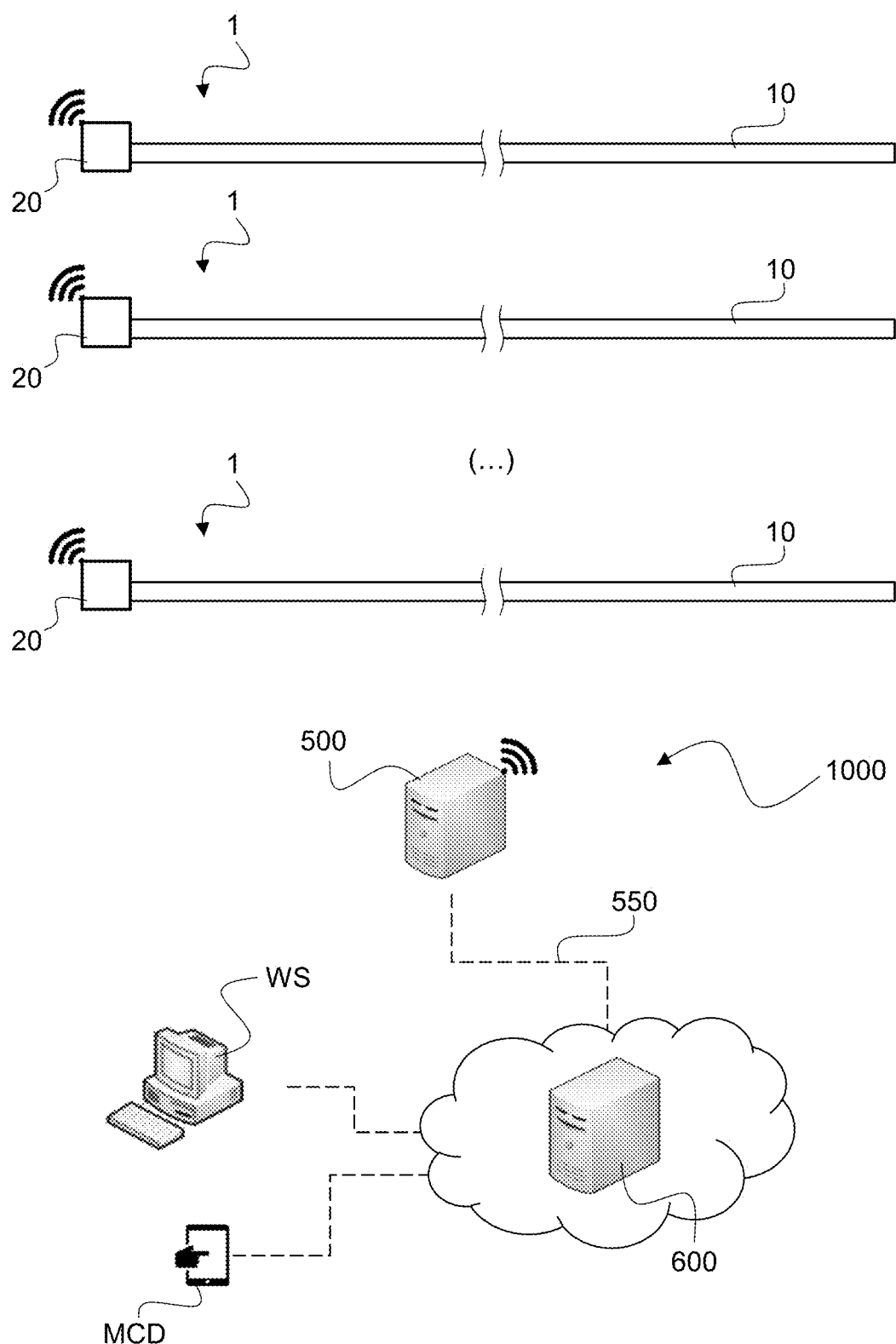
FIG. 5 is a schematic view of a sensor system according to the invention.

Moreover, the sensor unit 20 preferably further comprises a transceiver 210 for transmission of data collected by the sensor unit 20 to a remote unit or station (in particular to an associated data collection unit 500 as schematically shown in FIG. 5). Such data transmission preferably takes place over a wireless network, in particular a low-power wide-area network, or "LPWAN", such as LoRa® network, also referred to as LoRaWAN® (LORA® and LoRaWAN® being registered trademarks of Semtech Corporation). LoRa® (which stands for "Long Range") is a proprietary radio communication technique based on spread spectrum modulation techniques derived from chirp spread spectrum (CSS) technology as originally developed by company Cycleo SAS, since acquired by company Semtech Corporation (see e.g. U.S. Pat. No. 9,647,718 B2 and European Patent No. EP 3 002 884 B1). Other suitable LPWAN technologies could however be contemplated, including technologies as used in the Internet of Things (IoT) to provide wireless interconnectivity between spatially-distributed sensors and data collection units.

The sensor unit 20 is preferably further configured to transmit via the transceiver 210 (in addition to measurement data collected by the sensor unit 20) a unique identifier of the sensor device 1 and/or additional data relating to configuration and/or operation of the sensor device 1. Such additional data may in particular include a charge level of the power source 250 and any other data relating to configuration and/or operation of the sensor unit 20, such as operating temperature.

As previously mentioned, the sensor strip 10 and sensor device 1 of the invention may be used for the purpose of detecting liquid, especially water, flowing over a selected region of the floor surface FL on which the sensor strip 10 is laid. As shown in FIGS. 1A-B, which is illustrative of a possible industrial or commercial environment (namely, a store-like environment such as a hypermarket or supermarket environment) comprising multiple refrigerating apparatuses FR positioned on the floor surface FL, each sensor strip is laid over the floor surface FL to detect flow of liquid caused by leaks or condensation of liquid from the refrigerating apparatuses FR. In accordance with the invention, each sensor strip 10 may especially be covered by a floor covering FO (such as but not limited to a floor covering FO made of individual flooring tiles FT) that is laid over the floor surface FL. More specifically, each sensor strip 10 may especially be positioned along and under a border section $FO_A$ of the floor covering FO to detect flow of liquid originating from the refrigerating apparatuses FR and spreading between the border section $FO_A$ of the floor covering FO and the floor surface FL. In other embodiments, the sensor strip 10 may be positioned along and immediately next to the border section $FO_A$ of the floor covering FO, without being covered thereby, to detect flow of liquid that is bound to spread between the border section $FO_A$ of the floor covering FO and the floor surface FL.

FIG. 5 is a schematic illustration of a sensor system, designated globally by reference numeral 1000 comprising at least one data collection unit 500 and multiple sensor devices 1 in accordance with the invention that are in operative communication with the at least one data collection unit 500. While a single data collection unit 500 is shown in FIG. 5, multiple data collection units 500 could be distributed, each in operation with a corresponding subset of multiple sensor devices 1. Each data collection unit 500 can be configured to handle and collect data from all sensor devices 1 located within communication range of the data collection unit 500. The ability to handle and collect data from multiple sensor devices 1 will be dependent in practice on the relevant range over which data can reliably be transmitted. Ideally, such transmission range is preferably selected to be of at least 200 m in a store-like environment. By way of preference, each data collection unit 500 is configured to at least temporarily store data gathered by the sensor devices 1 for a selected minimum duration of e.g. at least a month.

As schematically illustrated in FIG. 5, each data collection unit 500 is preferably provided with the ability to communicate with a remote server 600, such as a cloud server, over a wireless or wired connection 550, such as a suitable cellular network or through a local Internet gateway. Once collected on the remote server 600 (and optionally further processed), the collected data may be retrieved or accessed, especially via suitable software dashboard running on a workstation WS or mobile computing device MCD (such as a laptop, tablet, smartphone, etc.) having authorization to access the remote server 600.

In other embodiments, the multiple sensor devices 1 could communicate data to the remote server 600 through a suitable gateway unit, such as LPWAN gateway, without there being a need to collect data locally.

Figure 7:
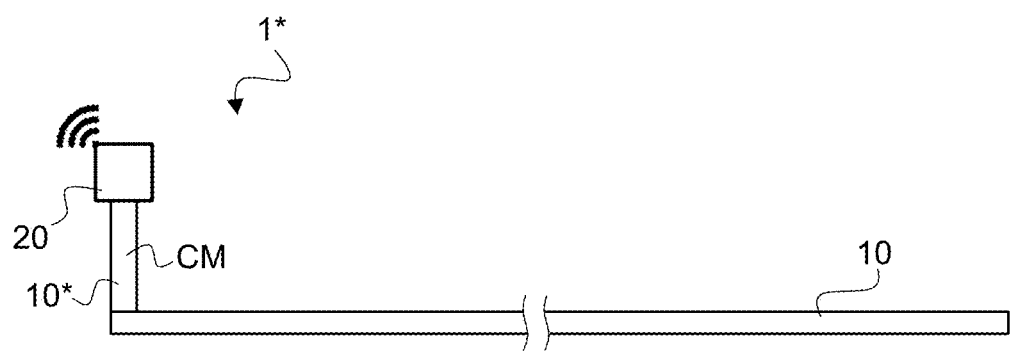
FIG. 7 is a schematic top view of an alternative sensor device configuration including a sensor unit coupled to a sensor strip of the invention via a connection strip.

FIG. 7 is a schematic top view of an alternate configuration of a sensor device 1\* including a sensor unit 20 (similar to the sensor unit 20 described with reference to FIGS. 4A and 4B) coupled to a sensor strip 10 of the invention via an intermediate connection member CM. In the illustrated example, the connection member CM advantageously includes a connecting strip 10\* that extends substantially perpendicularly to the sensor strip 10, thereby providing for the ability to locate the sensor unit 20 at a distance from the sensor strip 10 (rather than longitudinally along the length of the sensor strip 10 as shown e.g. in FIGS. 2, 4A-B and 5). This for instance allows for the ability to locate the sensor unit 20 under e.g. a nearby refrigerating apparatus FR. It is to be understood that the function of the connection member CM is essentially to allow the sensor unit 20 to be operatively coupled to the sensor strip 10. In the illustrated example, the connecting strip 10\* may be designed in a manner similar to the sensor strip 10, namely as a substantially flat insulating substrate S\* made e.g. of a flexible material that is likewise designed to be laid on the floor surface FL, the connecting strip 10\* including a plurality of connecting tracks CT provided on the insulating substrate S\* (as shown schematically in FIG. 8) and electrically connected to the plurality of conductive tracks 101, 102, 111-115 of the sensor strip 10, via the relevant inputs $C_1$, $C_2$ and $IN_1$ to $IN_5$.

Figure 8:
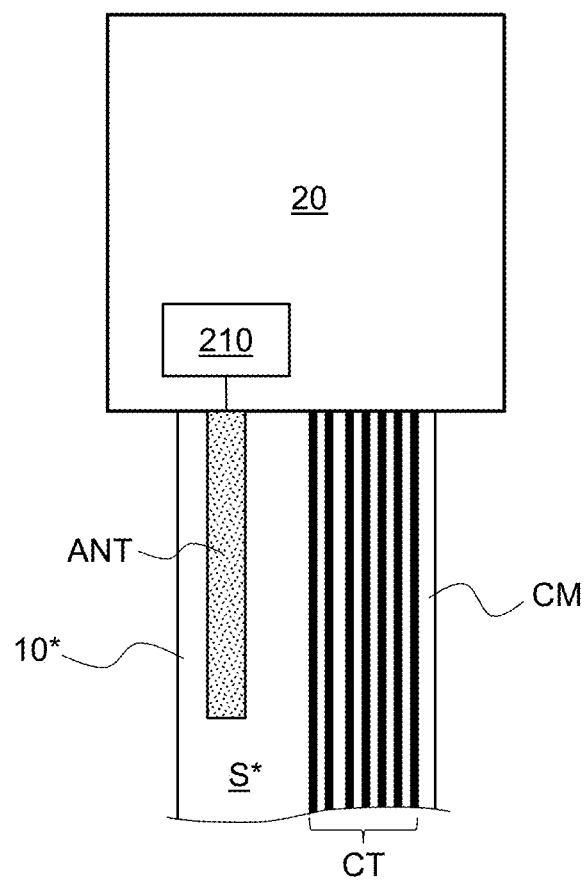
FIG. 8 is a schematic top view of an illustrative example of part of the connection strip of FIG. 7.

Advantageously, as shown schematically in FIG. 8, an antenna structure ANT may be provided on the connection member CM for operative connection to the transceiver 210 of the sensor unit 20, for instance by providing a suitable antenna pattern on the surface of the connecting strip 10\* and operatively connecting this antenna pattern to the transceiver 210. This may ensure that the transceiver 210 can adequately and reliably transmit the data collected by the sensor unit 20 in the event the sensor unit 20 were to be located underneath e.g. a nearby refrigerating apparatus FR that could potentially interfere with data transmission. Alternatively, the antenna structure ANT could be provided on the sensor strip 10 and be operatively coupled to the transceiver 210 of the sensor unit 20, either directly or via the aforementioned connection member CM.

It will be understood that the underlying principle of the invention which relies upon the use of a substantially flat and elongated sensor strip may form an integral part of a flooring system for covering a floor surface as recited in the appended claims, namely, a flooring system including a floor covering (such as but not limited to a floor covering FO made of individual flooring tiles FT as shown e.g. in FIG. 1B) that is laid over the relevant floor surface. While the solution discussed with reference to FIGS. 1A-B to 5 is preferably used, one could in effect contemplate the use of any other suitable sensor strip adapted to detect a flow of liquid, such as water, spreading (or bound to spread) between the floor covering and the floor surface. The sensor strip itself could potentially be secured to or integrated on an underside of the floor covering. The aforementioned considerations set forth with respect to the sensor strip 10 of FIGS. 1A-B to 5 and its use apply by analogy.

By the same token, it will be appreciated that the underlying detection methodology also forms an aspect of the present invention, as recited in the appended claims.

Various modifications and/or improvements may be made to the above-described embodiments without departing from the scope of the invention as defined by the appended claims.

For instance, while FIGS. 3A-D show individual sensor strip sections 100A, 100 sharing a same arrangement of conductive tracks 101, 102, 111-115, which sensor strip sections are connected in series, one after the other, to form the sensor strip 10, the sensor strip sections 100A, 100 may potentially differ from one another with only those conductive tracks being provided where they are of use.

Furthermore, the sensor strip 10 may alternatively be designed as a single sensor strip segment of the appropriate length that is provided with the required arrangement of conductive tracks needed for detection purposes, doing without the necessity to provide contact pads and connect the same at the intersection between adjacent detection zones.

LIST OF REFERENCE NUMERALS AND SIGNS USED THEREIN 1 sensor device
1* sensor device (alternate configuration of FIG. 7)
10 sensor strip
20 sensor unit electrically connected to sensor strip 10
25 sensor casing housing sensor unit 20
100 sensor strip sections
100A foremost sensor strip section
100p preceding sensor strip section
100f following sensor strip section
100a contact pads at upstream end of each conductive track 101, 102, 111-115
100b contact pads at downstream end of each conductive track 101, 102, 111-115
101 conductive track/first reference track
102 conductive track/second reference track
111 conductive track/first detection track/detection track of foremost sensor strip section 100A assigned to first detection zone $DZ_1$
112 conductive track/second detection track/detection track of foremost sensor strip section 100A assigned to second detection zone $DZ_2$
113 conductive track/third detection track/detection track of foremost sensor strip section 100A assigned to third detection zone $DZ_3$
114 conductive track/fourth detection track/detection track of foremost sensor strip section 100A assigned to fourth detection zone $DZ_4$
115 conductive track/fifth (e.g. last) detection track/detection track of foremost sensor strip section 100A assigned to fifth detection zone $DZ_5$
200 electronics to acquire and process data measured using sensor strip 10
210 transceiver (e.g. LPWAN transceiver)
220 processing logic
250 power source (e.g. non-rechargeable battery)
500 data collection unit(s)
550 wireless or wired connection between data collection unit(s) 500 and remote server 600 (e.g. cellular network or Internet connection)
600 remote server (e.g. cloud server)
1000 sensor system
S flexible insulating substrate made e.g. of polyimide or polyethylene terephthalate (PET) material
I insulating layer covering the conductive tracks 101, 102, 111-115
DA detection areas where insulating layer I is omitted to expose conductive tracks 102 and 111
$DZ_1$-$DZ_5$ detection zones
$IN_1$-$IN_5$ liquid detection inputs
$R_{EOL}$ end of line resistor provided at the downstream end of each sensor strip section 100A, 100 between the first detection track 111 and the first reference track 101
$R_{VAR}$ variable resistance affected by liquid flowing over conductive tracks 102, 111
SW user input (e.g. reset/trigger switch)
W width of sensor strip 10 as measured in transverse direction y
L (overall) length of sensor strip 10 as measured in longitudinal direction x
L0 predefined length of individual sensor strip sections 100A, 100/length of each detection zone $DZ_1$-$DZ_5$
T thickness of sensor strip 10 as measured along vertical direction, perpendicularly to longitudinal and transverse directions x, y
x longitudinal direction
y transverse direction
z vertical direction
FL floor surface
FO floor covering (made e.g. of individual flooring tiles or of a continuous or semicontinuous sheet of cover material) laid over floor surface FL
$FO_A$ border section of floor covering FO
FT flooring tiles
FR refrigerating apparatus(es) positioned on the floor surface FL (e.g. fridge(s), freezer(s), refrigerated cabinet(s), etc.)
WS workstation
MCD mobile computing device (e.g. laptop, tablet or smartphone)
CM connection member for electrical connection of sensor strip 10 to sensor unit 20 (alternative sensor device configuration of FIG. 7)
10* connecting strip of connection member CM
S* flexible insulating substrate made e.g. of polyimide or polyethylene terephthalate (PET) material
CT connecting tracks formed on connecting strip 10* and electrically coupled to conductive tracks 101, 102, 111-115 of sensor strip 10
ANT antenna structure (e.g. printed antenna pattern) provided on connection member CM or, alternatively, on sensor strip 10, and operatively coupled to transceiver 210 of sensor unit 20

The invention claimed is:

1. A sensor strip for detecting a presence of liquid flowing over a selected region of a floor surface or a level of humidity in the selected region of the floor surface, wherein the sensor strip comprises a substantially flat and elongated insulating substrate made of flexible material and designed to be laid on the floor surface,
   wherein the sensor strip exhibits a width as measured in a transverse direction, a length as measured in a longitudinal direction, and a thickness as measured perpendicularly to the longitudinal and transverse directions,
   wherein the sensor strip includes a plurality of conductive tracks, which are provided on the insulating substrate and extend substantially in the longitudinal direction, and at least one insulating layer covering the conductive tracks with the exception of one or more selected detection areas where parts of the conductive tracks are exposed for detection of the presence of liquid or of the level of humidity,
   wherein the plurality of conductive tracks comprises at least one reference track and at least a first detection track,
   wherein the at least one reference track and the at least first detection track are at least partly exposed in the selected detection areas to act as sensor electrodes,
   wherein the plurality of conductive tracks comprises multiple detection tracks, including the first detection track, for detection of the presence of liquid or of the level of humidity within a plurality of distinct detection zones that are distributed along the length of the sensor strip,
   wherein the sensor strip includes multiple sensor strip sections that are each assigned to a corresponding one of the detection zones,
   wherein the multiple sensor strip sections are individual sensor strip sections that are connected in series one after the other to form the sensor strip and that share a same arrangement of the plurality of conductive tracks,
   wherein the multiple detection tracks are configured such that each detection track of a foremost one of the multiple sensor strip sections is assigned to a corresponding one of the distinct detection zones and forms a corresponding one of multiple liquid detection inputs,
   wherein the first detection track is the only detection track being at least partly exposed in each detection zone,
   wherein, at a downstream end of each sensor strip section, the first detection track comes to an end and is terminated by an end of line resistor,
   wherein, at a transition between preceding and following sensor strip sections, the second to last detection tracks of the preceding sensor strip section are respectively connected to the first to penultimate detection tracks of the following sensor strip section,
   and wherein the last detection track of each following sensor strip section is not connected to any detection track of the preceding sensor strip section and is not accordingly exploited for detection purposes.

2. A sensor strip for detecting a presence of liquid flowing over a selected region of a floor surface or a level of humidity in the selected region of the floor surface,
   wherein the sensor strip comprises a substantially flat and elongated insulating substrate made of flexible material and designed to be laid on the floor surface,
   wherein the sensor strip exhibits a width as measured in a transverse direction, a length as measured in a longitudinal direction, and a thickness as measured perpendicularly to the longitudinal and transverse directions,
   wherein the sensor strip includes a plurality of conductive tracks, which are provided on the insulating substrate and extend substantially in the longitudinal direction, and at least one insulating layer covering the conductive tracks with the exception of one or more selected detection areas where parts of the conductive tracks are exposed for detection of the presence of liquid or of the level of humidity,
   wherein the plurality of conductive tracks comprises at least one reference track and at least a first detection track,
   wherein the at least one reference track and the at least first detection track are at least partly exposed in the selected detection areas to act as sensor electrodes,
   wherein the plurality of conductive tracks comprises multiple detection tracks, including the first detection track, for detection of the presence of liquid or of the level of humidity within a plurality of distinct detection zones that are distributed along the length of the sensor strip,
   and wherein the multiple detection tracks are configured such that each detection track of a foremost sensor strip section of the sensor strip is assigned to a corresponding one of the detection zones and forms a corresponding one of multiple liquid detection inputs.

3. The sensor strip according to claim 2, wherein the sensor strip includes multiple sensor strip sections that are each assigned to a corresponding one of the detection zones.

4. The sensor strip according to claim 3, wherein the multiple sensor strip sections are individual sensor strip sections that are connected in series one after the other to form the sensor strip and that share a same arrangement of the plurality of conductive tracks.

5. The sensor strip according to claim 3, wherein the sensor strip sections are each produced in a predefined length corresponding to a given length of each detection zone.

6. The sensor strip according to claim 2, wherein the sensor strip includes between one to twenty detection zones.

7. The sensor strip according to claim 2, exhibiting any one of the following features or any combination thereof:
   the sensor strip exhibiting an overall length comprised between 0.5 m and 25 m;
   the width of the sensor strip being of less that 10 cm or of 5 cm or less;
   the thickness of the sensor strip being of less than 1 mm or of 0.5 mm or less; and
   the insulating substrate being made of polyimide or polyethylene terephthalate (PET) material.

8. The sensor strip according to claim 2, wherein the sensor strip is a totally passive element that is electrically connectable to a dedicated sensor unit configured to power the sensor strip and process signals as detected by the sensor strip.

9. A sensor device for detecting a presence of liquid flowing over a selected region of a floor surface or a level of humidity in the selected region of the floor surface, wherein the sensor device includes a sensor strip in accordance with claim 2 and a sensor unit electrically connected to the sensor strip to gather data measured using the sensor strip.

10. The sensor device according to claim 9, wherein the sensor unit comprises electronics configured to acquire and process data measured using the sensor strip and a power source to power the electronics and the sensor strip.

11. The sensor device according to claim 10, wherein the power source is a non-rechargeable battery, and/or
wherein the power source is configured to ensure a power autonomy of several years.

12. A sensor device for detecting a presence of liquid flowing over a selected region of a floor surface or a level of humidity in the selected region of the floor surface, wherein the sensor device includes a sensor strip in accordance with claim 2 and a sensor unit electrically connected to the sensor strip to gather data measured using the sensor strip,
and wherein the sensor unit is configured to gather data for each detection zone.

13. The sensor device according to claim 12, wherein the sensor unit is configured to gather data packets for each detection zone on a periodic basis.

14. The sensor device according to claim 9, wherein the sensor unit is housed entirely within a sensor casing.

15. The sensor device according to claim 14, exhibiting any one of the following features or any combination thereof:
the sensor casing being configured to be dustproof and waterproof;
the sensor strip being woundable around the sensor casing for storage and/or shipment prior to installation;
the sensor casing being provided with an attachment means for fixation to a nearby mounting surface; and
the sensor unit being provided with a user input accessible from outside the sensor casing to initialize and/or reset the sensor unit.

16. The sensor device according to claim 9, wherein the sensor unit comprises a transceiver for transmission of data collected by the sensor unit to a remote unit or station.

17. The sensor device according to claim 16, wherein the transceiver is configured to transmit data to a data collection unit over a wireless network.

18. The sensor device according to claim 17, wherein the wireless network is a low-power wide-area network and wherein the transceiver is a LoRa transceiver.

19. The sensor device according to claim 16, wherein the sensor strip further includes an antenna structure that is operatively coupled to the transceiver for transmission of the data collected by the sensor unit, or
wherein the sensor unit is electrically connected to the sensor strip via a connection member, the connection member further including an antenna structure that is operatively coupled to the transceiver for transmission of the data collected by the sensor unit.

20. A sensor system comprising at least one remote unit and one or multiple sensor devices in accordance with claim 9 in operative communication with the at least one remote unit to share data therewith or therethrough.

21. The sensor system according to claim 20, wherein each remote unit is capable of handling data from several hundreds of sensor devices.

22. The sensor system according to claim 20, comprising more than one remote unit each in operative communication with a corresponding subset of one or multiple sensor devices.

23. The sensor system according to claim 20, wherein each remote unit is a data collection unit configured to at least temporarily store data gathered by the one or more sensor devices for a selected minimum duration.

24. The sensor system according to claim 20, wherein each remote unit is configured to communicate with a cloud server or to allow each sensor device to communicate with the cloud server over a wireless or wired connection.

25. The sensor system according to claim 24, wherein data collected by the cloud server is accessible via a software dashboard running on a workstation or a mobile computing device.

26. A flooring system for covering a floor surface, for use in an industrial or commercial environment comprising one or multiple refrigerating apparatuses positioned on the floor surface, the flooring system including a floor covering that is laid over the floor surface,
wherein the floor covering is positioned next to an area covered by the one or multiple refrigerating apparatuses,
wherein the flooring system is provided with a sensor strip in accordance with claim 2 that is positioned on the floor surface under the floor covering to detect a flow of liquid spreading between the floor covering and the floor surface,
and wherein the sensor strip is positioned under the floor covering to detect flow of liquid caused by leaks or condensation of liquid from the one or multiple refrigerating apparatuses and spreading between the floor covering and the floor surface.

27. A method of detecting a presence of liquid spreading between a floor surface and a floor covering that is laid over the floor surface, the method being applied in an industrial or commercial environment comprising one or multiple refrigerating apparatuses positioned on the floor surface, wherein the floor covering is positioned next to an area covered by the one or multiple refrigerating apparatuses, the method comprising the following steps:
positioning an elongated sensor strip in accordance with claim 2 on the floor surface under the floor covering to detect a flow of liquid spreading between the floor covering and the floor surface, the sensor strip being positioned under the floor covering to detect flow of liquid caused by leaks or condensation of liquid from the one or multiple refrigerating apparatuses and spreading between the floor covering and the floor surface; and
gathering data measured using the sensor strip and processing such data to check for the presence of liquid.

* * * * *